(12) United States Patent
Goodfellow

(10) Patent No.: US 8,221,628 B2
(45) Date of Patent: Jul. 17, 2012

(54) METHOD AND SYSTEM TO RECOVER WASTE HEAT TO PREHEAT FEED WATER FOR A REVERSE OSMOSIS UNIT

(75) Inventor: John A. Goodfellow, Waterloo (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 191 days.

(21) Appl. No.: 12/756,850

(22) Filed: Apr. 8, 2010

(65) Prior Publication Data

US 2011/0247980 A1 Oct. 13, 2011

(51) Int. Cl.
| | |
|---|---|
| *B01D 61/00* | (2006.01) |
| *B01D 63/00* | (2006.01) |
| *B01D 35/18* | (2006.01) |
| *F23D 3/00* | (2006.01) |
| *F25B 39/04* | (2006.01) |

(52) U.S. Cl. ............... 210/652; 210/175; 210/257.2; 210/195.2; 62/171; 62/183; 62/205

(58) Field of Classification Search .......... 210/652, 210/175, 257.2, 195.2; 62/171, 183, 305, 62/506

See application file for complete search history.

(56) References Cited

U.S. PATENT DOCUMENTS

| | | | |
|---|---|---|---|
| 3,640,084 A | 2/1972 | Hopkins et al. | |
| 3,744,264 A | 7/1973 | Ware | |
| 3,744,273 A | 7/1973 | Ware | |
| 3,864,929 A | 2/1975 | Hopkins | |
| 3,864,930 A | 2/1975 | Hopkins | |
| 3,992,301 A | 11/1976 | Shippey et al. | |
| 4,141,825 A * | 2/1979 | Conger | 210/638 |
| 4,163,445 A * | 8/1979 | Stanger | 126/632 |
| 4,176,057 A * | 11/1979 | Wheatley et al. | 210/637 |
| 4,214,626 A | 7/1980 | Spethmann | |
| 4,347,704 A * | 9/1982 | Marquardt et al. | 60/648 |
| 4,391,102 A | 7/1983 | Studhalter et al. | |
| 4,406,138 A | 9/1983 | Nelson | |

(Continued)

FOREIGN PATENT DOCUMENTS

JP 63004808 1/1988

(Continued)

OTHER PUBLICATIONS

Trane Engineers Newsletter, vol. 20, No. 3, 1991.

*Primary Examiner* — Ana Fortuna

(74) *Attorney, Agent, or Firm* — Snell & Wilmer LLP

(57) ABSTRACT

In one embodiment, the present invention includes a liquid processing system. In the liquid processing system, a first liquid source transmits feed liquid to a heat exchange unit while a heat generation unit transmits warm coolant to the heat exchange unit. A heat generation unit warms the feed liquid while cooling the warm coolant. The warmed feed liquid is sent to a pump, and cooled feed liquid from a second liquid source is mixed with the warmed feed liquid as necessary until a target temperature is reached. The warmed feed liquid is sent to a reverse osmosis unit for filtering and the resulting permeate is sent to the liquid utilization unit. The cooled coolant is sent from the heat exchange unit to the storage tank and if the cooled coolant is not cool enough, it is sent to a cooling tower for further cooling.

20 Claims, 2 Drawing Sheets

U.S. PATENT DOCUMENTS

| | | |
|---|---|---|
| 4,446,703 A | 5/1984 | Gilbertson |
| 4,921,610 A | 5/1990 | Ford et al. |
| 5,040,377 A | 8/1991 | Braun et al. |
| 5,101,639 A | 4/1992 | Wruck et al. |
| 5,131,236 A | 7/1992 | Wruck et al. |
| 5,131,238 A * | 7/1992 | Meckler ................ 62/271 |
| 5,133,193 A | 7/1992 | Wruck et al. |
| 5,138,842 A | 8/1992 | Wruck et al. |
| 5,170,635 A | 12/1992 | Wruck et al. |
| 5,172,565 A | 12/1992 | Wruck et al. |
| 5,198,116 A | 3/1993 | Comstock et al. |
| 5,329,758 A * | 7/1994 | Urbach et al. ............ 60/775 |
| 5,498,338 A | 3/1996 | Kruger et al. |
| 5,651,894 A * | 7/1997 | Boyce et al. ............. 210/652 |
| 5,797,275 A | 8/1998 | Forsman |
| 6,074,551 A | 6/2000 | Jones et al. |
| 6,077,435 A | 6/2000 | Beck et al. |
| 6,185,943 B1 | 2/2001 | Kopko |
| 6,332,110 B1 | 12/2001 | Wolfe |
| 6,405,543 B2 | 6/2002 | Kopko |
| 6,556,930 B1 | 4/2003 | Lueck |
| 6,560,543 B2 | 5/2003 | Wolfe et al. |
| 6,640,561 B2 | 11/2003 | Roberto |
| 6,644,049 B2 | 11/2003 | Alford |
| 6,730,227 B2 | 5/2004 | Zeiher et al. |
| 6,823,684 B2 * | 11/2004 | Jensen ............... 62/171 |
| 7,036,330 B2 | 5/2006 | Grabon et al. |
| 7,104,115 B2 | 9/2006 | Kahn et al. |
| 7,174,273 B2 | 2/2007 | Goldberg |
| 7,216,698 B2 | 5/2007 | Catzel |
| 7,371,319 B2 | 5/2008 | Wood et al. |
| 7,416,644 B2 * | 8/2008 | Bonde ................ 203/14 |
| 7,581,409 B2 | 9/2009 | Bailey et al. |
| 7,591,309 B2 * | 9/2009 | Minnich et al. ........... 166/266 |
| 7,658,079 B2 | 2/2010 | Bailey et al. |
| 7,749,386 B2 * | 7/2010 | Voutchkov ............... 210/652 |
| 8,048,311 B2 * | 11/2011 | Wallace et al. ............ 210/652 |
| 8,075,740 B2 * | 12/2011 | Bailie et al. ............. 202/176 |
| 2003/0000230 A1 | 1/2003 | Kopko |
| 2003/0015471 A1 | 1/2003 | Reichwein et al. |
| 2004/0074850 A1 * | 4/2004 | Kelly ................. 210/806 |
| 2006/0010893 A1 | 1/2006 | Dominguez |
| 2007/0283716 A1 | 12/2007 | Marsala |
| 2008/0016890 A1 | 1/2008 | Dominguez |
| 2009/0171512 A1 | 7/2009 | Duncan |
| 2009/0260381 A1 | 10/2009 | Bittner et al. |
| 2010/0023166 A1 | 1/2010 | Chessel et al. |
| 2010/0036530 A1 | 2/2010 | Chessel et al. |
| 2010/0036531 A1 | 2/2010 | Chessel et al. |
| 2010/0042265 A1 | 2/2010 | Rigal et al. |
| 2010/0050669 A1 | 3/2010 | Poux et al. |
| 2010/0065650 A1 | 3/2010 | Phillips |
| 2010/0070082 A1 | 3/2010 | Chessel et al. |
| 2010/0077776 A1 | 4/2010 | Takenami et al. |
| 2010/0078160 A1 | 4/2010 | Novotny et al. |
| 2010/0094465 A1 | 4/2010 | Chessel et al. |
| 2011/0278226 A1 * | 11/2011 | Nicoll ................ 210/639 |

FOREIGN PATENT DOCUMENTS

| | | |
|---|---|---|
| JP | 6254553 | 9/1994 |
| JP | 6254554 | 9/1994 |
| JP | 10192853 | 7/1998 |
| JP | 2001062255 | 3/2001 |
| JP | 2004108864 | 4/2004 |
| JP | 2005052793 | 3/2005 |

* cited by examiner

METHOD AND SYSTEM TO RECOVER WASTE HEAT TO PREHEAT FEED WATER FOR A REVERSE OSMOSIS UNIT

BACKGROUND

1. Field

The present invention relates to a method and system to recover waste heat to preheat feed water for a reverse osmosis unit.

2. Description of the Related Art

A conventional reverse osmosis unit receives feed water and filters the feed water to generate permeate and concentrate. The reverse osmosis unit uses filters in filter banks to filter the feed water. The performance of the filters, however, is impacted by the temperature of the feed water. Feed water with too low of a temperature can decrease yield of the feed water, or the amount of permeate generated compared to the amount of concentrate generated. Conversely, feed water with too high of a temperature can damage the filters in the filter banks. However, adjusting the temperature of the feed water can be costly and require a large expenditure of energy.

Thus, there is a need for a method and system to recover waste heat to preheat feed water for a reverse osmosis unit.

SUMMARY

The present invention includes a method and system to recover waste heat to preheat feed water for a reverse osmosis unit. In one embodiment, the present invention includes a liquid processing system including multiple liquid sources, a heat exchange unit, a heat generation unit, a pump, a storage tank, a cooling tower, a reverse osmosis unit, and/or a liquid utilization unit. A first liquid source transmits feed liquid to the heat exchange unit while the heat generation unit transmits warm coolant to the heat exchange unit. The heat generation unit uses the heat from the warm coolant to warm the feed liquid, and in doing so, cools the warm coolant. The warmed feed liquid is sent to the pump, where a temperature sensor detects a temperature of the feed liquid. If the warmed feed liquid is too warm, cooled feed liquid from a second liquid source is mixed with the warmed feed liquid until a target temperature is reached. The warmed feed liquid is sent to the reverse osmosis unit for filtering and the resulting permeate is sent to the liquid utilization unit. The cooled coolant is sent from the heat exchange unit to the storage tank where a temperature sensor detects a temperature of the cooled coolant to determine if it is cool enough. If the cooled coolant is not cool enough, it is sent to the cooling tower to be further cooled. The cooled coolant can then be held in the storage tank until used by the heat generation unit.

Thus, the liquid processing system improves yield of the permeate by increasing a temperature of the feed liquid. Furthermore, the liquid processing system cools the coolant from the heat generation unit, which reduces energy costs and the amount of time the cooling tower is active. This allows for a further reduction in costs.

In one embodiment, the present invention is a liquid processing system including a heat exchange unit receiving feed water and increasing a temperature of the feed water to generate a warmed feed liquid, and a reverse osmosis unit receiving the warmed feed liquid.

In another embodiment, the present invention is a water processing system including a heat exchange unit receiving feed water and increasing a temperature of the feed water to generate a warmed feed water, a pump connected between the heat exchange unit and receiving the warmed feed water, a reverse osmosis unit connected to the pump and receiving the warmed feed water from the pump, and a heat generating equipment connected to the heat exchange unit, the heat generating equipment supplying coolant to the heat exchange unit, wherein the heat exchange unit cools the coolant to warm the feed water.

In yet another embodiment, the present invention is a method for processing water including receiving feed water at a heat exchange unit, increasing a temperature of the feed water using the heat exchange unit to generate warmed feed water, and supplying the warmed feed water to a reverse osmosis unit.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
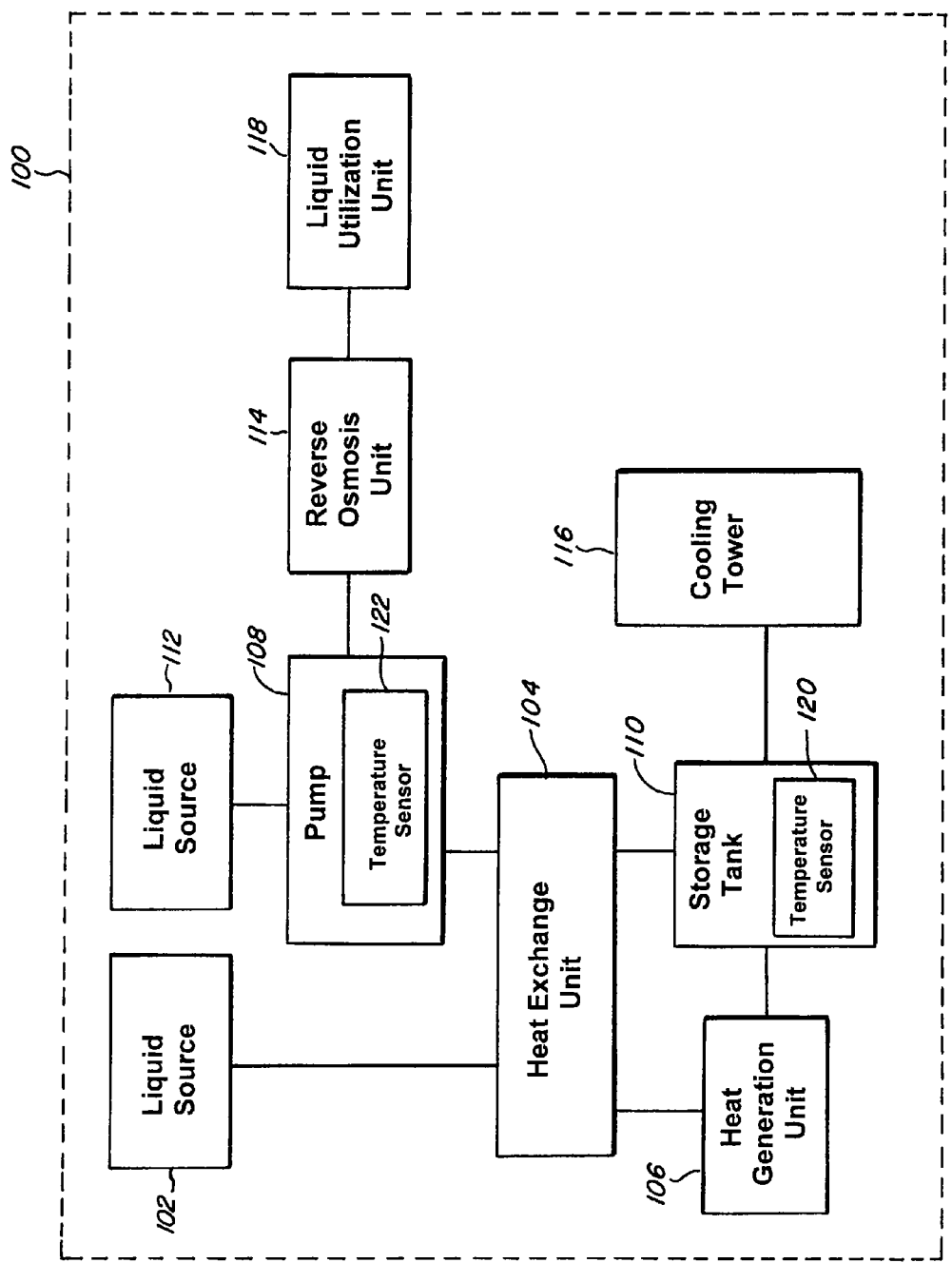
FIG. 1 is a box diagram of a liquid processing system according to an embodiment of the present invention.

In one embodiment, the present invention includes a liquid processing system 100 as shown in FIG. 1. The liquid processing system 100 can be, for example, a reverse osmosis system. The liquid processing system 100 includes, for example, a liquid source 102, a heat exchange unit 104, a heat generation unit 106, a pump 108, a storage tank 110, a liquid source 112, a reverse osmosis unit 114, a cooling tower 116, and/or a liquid utilization unit 118.

The liquid source 102 is connected to the heat exchange unit 104. The liquid source 102 supplies liquid, such as feed liquid to the heat exchange unit 104. The feed liquid can be, for example, feed water, juice, or any other type of liquid which can be filtered.

The heat generation unit 106 is connected to the heat exchange unit 104 and/or the storage tank 110. The heat generation unit 106 can supply warmed coolant to the heat exchange unit 104 to warm the heat exchange unit 104. In one embodiment, the heat generation unit 106 is one or more compressors. However, the heat generation unit 106 can be any type of heat generating equipment which supplies warmed coolant or other heat transferring material to the heat exchange unit 104 in order to warm the heat exchange unit 104.

The heat exchange unit 104 is connected to the liquid source 102, the heat generation unit 106, the pump 108, and/or the storage tank 110. The heat exchange unit 104 receives the warmed coolant from the heat generation unit 106 and the feed liquid from the liquid source 102. The feed liquid can have a temperature, for example, of about 10° C. or less in a winter time, and about 15° C. or less in a summer time. The heat exchange unit 104 uses the heat from the warmed coolant to warm the feed liquid. Through this process, the coolant is also cooled by the heat exchange unit 104.

The warmed feed liquid is sent to the pump 108, while the cooled coolant is sent to the storage tank 110.

The pump 108 is connected to the heat exchange unit 104 and/or a liquid source 112. The pump 108 can include, for example, a temperature sensor 122. The pump 108 receives the warmed feed liquid and the temperature sensor 122 can determine temperature data indicating a temperature of the warmed feed liquid. If the warmed feed liquid is above a predetermined feed liquid temperature threshold, the pump 108 can receive cold liquid from the liquid source 112 and blend the cold liquid with the warmed feed liquid.

In one embodiment, the predetermined feed liquid temperature threshold is about 25° C. or more. This can cool the warmed feed liquid to a target temperature. The target temperature can be selected, for example, to improve an efficiency of the reverse osmosis unit 114, such as the operations of filters within the reverse osmosis unit 114. In one embodiment, the target temperature can be, for example, about 25° C. In one embodiment, the target temperature and the predetermined feed liquid temperature threshold can be substantially the same. The warmed feed liquid is then sent to the reverse osmosis unit 114.

The reverse osmosis unit 114 is connected to the pump 108 and/or the liquid utilization unit 118. The reverse osmosis unit 114 receives the warmed feed liquid from the pump 108 and filters the warmed feed liquid to generate permeate and concentrate. The permeate, which is the filtered portion of the warmed feed liquid, is sent to the liquid utilization unit 118. The concentrate is removed and disposed.

The liquid utilization unit 118 is connected to the reverse osmosis unit 114. The liquid utilization unit 118 receives the permeate from the reverse osmosis unit 114. The liquid utilization unit 118 can be, for example, a cleaning plant for cleaning materials, a production plant for producing materials, a beverage development unit for producing beverages, or any other type of apparatus which can use the permeate.

The storage tank 110 is connected to the heat exchange unit 104, the heat generation unit 106, and/or the cooling tower 116. The heat exchange unit 104 can include, for example, a temperature sensor 120. The storage tank 110 can receive the cooled coolant from the heat exchange unit 104. The temperature sensor 120 can detect temperature data indicating, for example, a temperature of the cooled coolant. If the cooled coolant is above a predetermined coolant temperature threshold, the cooled coolant is sent to the cooling tower 116 for further cooling.

Thus, an amount of time that the cooling tower 116 is operational is reduced, reducing energy costs. Furthermore, since the cooling tower 116 will have a reduced load and/or operational time, a smaller number of cooling towers need to be installed. This can further reduce operational costs.

Thus, the liquid processing system 100 can cool the coolant, and use the energy from the coolant to warm the feed liquid. This can reduce an amount of energy used to cool the coolant, and warm the feed liquid. Furthermore, by warming the feed liquid to the target temperature, the reverse osmosis unit can function more efficiently and improve the yield of permeate from the reverse osmosis unit 114. With a greater yield, less feed liquid needs to be used and furthermore, less concentrate needs to be disposed. This can reduce the costs. In addition, the warned feed liquid at the target temperature can reduce the likelihood of damage to the filters in the reverse osmosis unit 114, providing additional cost savings.

Figure 2:
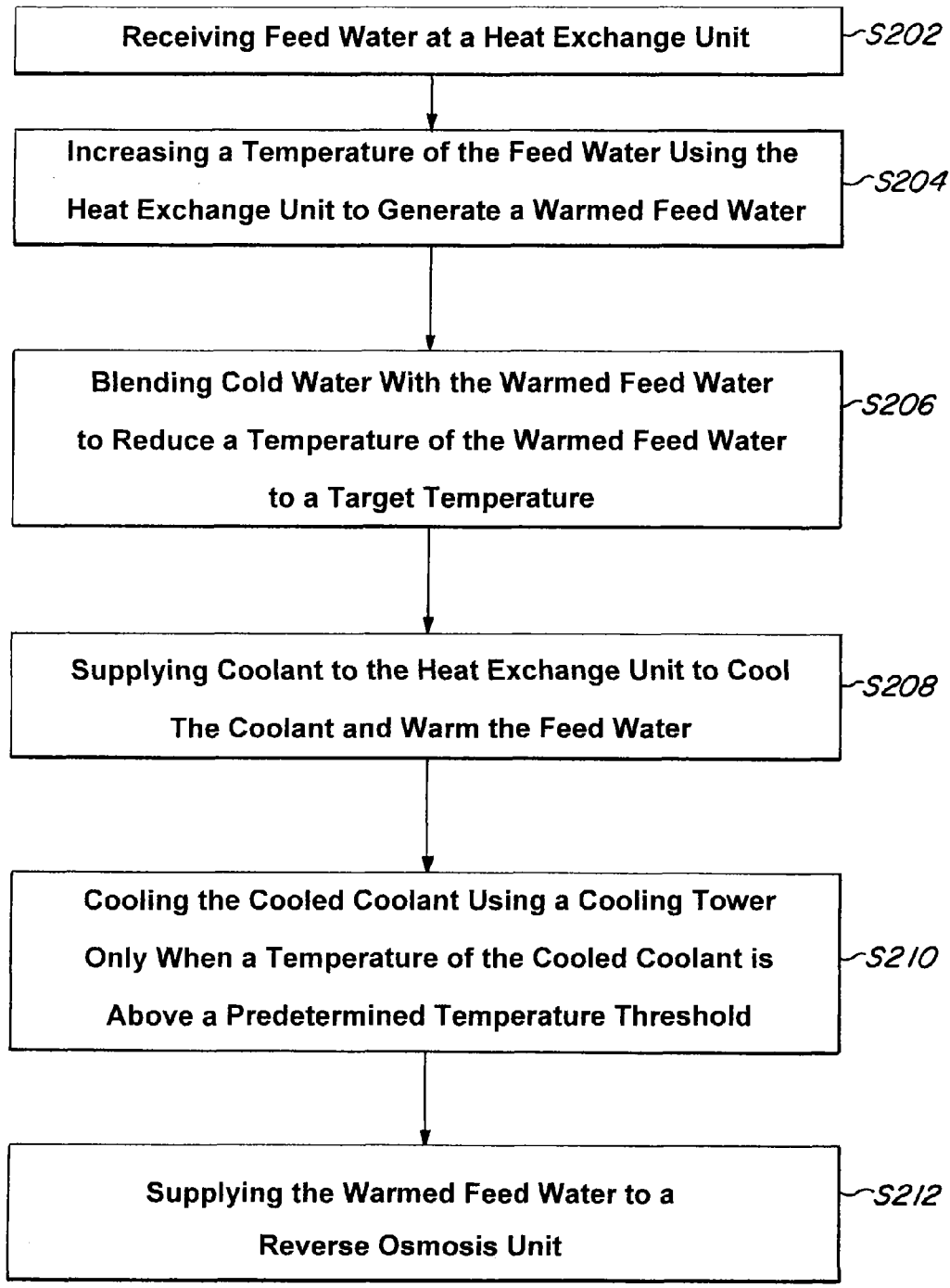
FIG. 2 depicts a process according to an embodiment of the present invention.

In one embodiment, the present invention is a process according to FIG. 2. In Step S202, feed water is received at the heat exchange unit. For example, the heat exchange unit 104 can receive the feed liquid from the liquid source 102. In Step S204, the temperature of the feed water is increased using a heat exchange unit to generate warmed feed water. For example, the heat exchange unit 104 can warm the feed liquid. In Step S206, cold feed water is blended with the warmed feed water to reduce a temperature of the warmed feed water to a target temperature. For example, if the temperature of the warmed feed liquid is above a predetermined feed liquid temperature threshold, the warmed feed water can be cooled to a target temperature by blending the warmed feed liquid with cold liquid from the liquid source 112.

In Step S208, a coolant is supplied to the heat exchange unit to cool the coolant and warm the feed water. For example, coolant from the heat generation unit 106 is supplied to the heat exchange unit 104 and the heat from the coolant is transferred by the heat exchange unit 104 to warm the feed liquid. In Step S210, the cooled coolant is cooled using a cooling tower 116 only when a temperature of the cooled coolant is above a predetermined temperature threshold. For example, the storage tank 110 can supply the cooled coolant to the cooling tower 116 when a temperature of the cooled coolant is above a predetermined cooled coolant temperature threshold. For example, In Step S212, the warmed feed water is supplied to a reverse osmosis unit 114. For example, the pump 108 can supply the warmed feed liquid to the reverse osmosis unit 114.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A liquid processing system comprising:
   a heat exchange unit configured to receive feed water and increase a temperature of the feed water to generate a warmed feed liquid;
   a reverse osmosis unit coupled with the heat exchange unit, the reverse osmosis unit configured to receive the warmed feed liquid;
   a heat generating unit coupled with the heat exchange unit, the heat generating unit configured to supply a coolant to the heat exchange unit and wherein the heat exchange unit is configured to cool the coolant to warm the feed liquid;
   a storage tank coupled with the heat exchange unit and the heat generating unit, the storage tank configured to store the cooled coolant; and
   a cooling tower coupled with the heat generating unit, the cooling tower configured to further cool the cooled coolant based upon a temperature of the cooled coolant.

2. The system of claim 1 further comprising a pump coupled with the heat exchange unit and the reverse osmosis unit, the pump configured to receive the warmed feed liquid from the heat exchange unit and supply the warmed feed liquid to the reverse osmosis unit.

3. The system of claim 2 wherein the pump is configured to blend a cold liquid with the warmed feed liquid to reduce a temperature of the warmed feed liquid.

4. The system of claim 3 wherein the pump is configured to blend the cold liquid with the warmed feed liquid to reduce the temperature of the warmed feed liquid to a target temperature.

5. The system of claim 4 wherein the target temperature is approximately 25° C.

6. The system of claim 1 wherein the heat generating unit is a compressor.

7. The system of claim 1 wherein the cooling tower is configured to further cool the cooled coolant only when the temperature of the cooled coolant is above a predetermined temperature threshold.

8. The system of claim 7 further comprising a sensor coupled with the storage tank, the sensor configured to sense the temperature of the cooled coolant in the storage tank.

9. A water processing system comprising:
   a heat exchange unit for receiving a feed water and increasing a temperature of the feed water to generate a warmed feed water;
   a pump connected with the heat exchange unit for receiving the warmed feed water from the heat exchange unit;
   a reverse osmosis unit connected with the pump;
   a heat generating unit connected with the heat exchange unit, the heat generating unit for supplying a coolant to the heat exchange unit, wherein the heat exchange unit is adapted to cool the coolant to warm the feed water; and
   a cooling tower connected with the heat generating unit, the cooling tower configured to further cool the cooled coolant only when a temperature of the cooled coolant is above a predetermined temperature.

10. The system of claim 9 wherein the pump is adapted to blend a cold water with the warmed feed water to reduce a temperature of the warmed feed water.

11. The system of claim 9 wherein the pump is adapted to blend a cold water with the warmed feed water to reduce a temperature of the warmed feed water to a target temperature.

12. The system of claim 11 wherein the target temperature is approximately 25° C.

13. The system of claim 9 further comprising a storage tank connected with the heat exchange unit and the heat generating unit, the storage tank adapted to store the cooled coolant.

14. The system of claim 13 further comprising a temperature sensor connected with the storage tank, the temperature sensor adapted to detect the temperature of the cooled coolant.

15. The system of claim 9 wherein the heat generating unit comprises at least one compressor.

16. A method for processing water comprising:
   receiving a feed water at a heat exchange unit;
   supplying a coolant to the heat exchange unit;
   increasing a temperature of the feed water using the heat exchange unit to generate a warmed feed water;
   cooling the coolant using the heat exchange unit;
   further cooling the cooled coolant using a cooling tower only if a temperature of the cooled coolant is above a predetermined temperature threshold; and
   supplying the warmed feed water to a reverse osmosis unit.

17. The method of claim 16 further comprising blending a cold water with the warmed feed water to reduce a temperature of the warmed feed water to a target temperature.

18. The method of claim 16 further comprising filtering the warmed feed water using the reverse osmosis unit to generate a permeate and a concentrate.

19. The method of claim 16 further comprising detecting, using a sensor, the temperature of the cooled coolant.

20. The method of claim 19 further comprising supplying the cooled coolant to the cooling tower only when the temperature of the cooled coolant is above the predetermined temperature threshold.

* * * * *